United States Patent [19]
Sasaki et al.

[11] Patent Number: 5,812,995
[45] Date of Patent: Sep. 22, 1998

[54] ELECTRONIC DOCUMENT FILING SYSTEM FOR REGISTERING AND RETRIEVING A PLURALITY OF DOCUMENTS

[75] Inventors: Masahiro Sasaki, Shiki; Yasuhiro Tsuchie, Yokosuka; Tsuyoshi Kuwano; Sachiyo Otsuka, both of Yokohama, all of Japan

[73] Assignee: Matsushita Electric Industrial Co., Ltd., Osaka, Japan

[21] Appl. No.: 822,899

[22] Filed: Mar. 24, 1997

Related U.S. Application Data

[63] Continuation-in-part of Ser. No. 194,604, Feb. 10, 1994, abandoned.

[30]    Foreign Application Priority Data

Oct. 14, 1993  [JP]  Japan .................................... 5-257272

[51] Int. Cl.⁶ ................................................. G06F 17/30
[52] U.S. Cl. .............................. 707/1; 707/100; 707/514; 707/907; 345/356
[58] Field of Search .................................... 707/1–6, 513, 707/514, 515, 100, 907; 345/356–357

[56]    References Cited

U.S. PATENT DOCUMENTS 5,309,359  5/1994  Katz et al. .............................. 345/357
5,418,946  5/1995  Mori ........................................... 707/1

Primary Examiner—Thomas G. Black
Assistant Examiner—Hosain T. Alam
Attorney, Agent, or Firm—Lowe Hauptman Gopstein Gilman & Berner

[57]    ABSTRACT

A plurality of documents and a plurality of types of classifications are registered on a plurality of hierarchy stages of a hierarchy structure. In each of the documents, a plurality of document files indicating contents of the document is stored in a contents file block, and document attribute information designating one or more document attributes peculiar to the document is stored in a document attribute information file. In each of the types of classifications, classification attribute information designating one or more classification attributes of the type of classification is stored in a classification attribute information file. The classification attributes have no connection with contents of any document. In the hierarchical structure, one or more documents and types of classifications characterized by a common attribute are registered on a first hierarchy stage on the basis of the classification attribute information, which designates the common attribute and is stored in one classification attribute information file of one type of classification registered on a second hierarchy stage higher than the first hierarchy stage by one hierarchy stage, for each hierarchy stage. Therefore, each document can be logically registered, preserved, retrieved and renewed at high speed while tracing a plurality of types of classifications one after another in the hierarchical structure.

6 Claims, 6 Drawing Sheets

FIG. 3A

CLASSIFICATION ATTRIBUTE INFORMATION FILE 28

| NAME OF A TYPE OF CLASSIFICATION | CLASSIFICATION C1 | R1 |
|---|---|---|
| OWNER | USER 1 | R2 |
| REGISTERED DATE | APRIL 1, 1992 | R3 |
| THE NUMBER OF THE HIERARCHY STAGE | 1 | R4 |
| DATA BASE INFORMATION | EXISTENCE OF A RETRIEVAL LIST | R5 |
| ACCESS PERMISSION INFORMATION | | R6 |
| ICON INFORMATION | | R7 |
| USER INFORMATION | | R8 |
| OTHER CLASSIFICATION ATTRIBUTE INFORMATION | | R9 |
| | | R10 |
| | | R11 |
| | | R12 |
| | | R13 |
| | | R14 |

FIG. 3B

DOCUMENT ATTRIBUTE INFORMATION FILE 32

| NAME OF A DOCUMENT | DOCUMENT D1 | R15 |
|---|---|---|
| OWNER | USER 2 | R16 |
| REGISTERED DATE | JUNE 1, 1992 | R17 |
| THE NUMBER OF THE HIERARCHY STAGE | 99 | R18 |
| DOCUMENT TYPE INFORMATION | WORD PROCESSOR 3 | R19 |
| ACCESS PERMISSION INFORMATION | | R20 |
| ICON INFORMATION | | R21 |
| USER INFORMATION | | R22 |
| OTHER CLASSIFICATION ATTRIBUTE INFORMATION | | R23 |
| | | R24 |
| | | R25 |
| | | R26 |
| | | R27 |
| | | R28 |

FIG. 3C

LISTING FILE ~34

| | NAME OF DOCUMENT OR CLASSIFICATION | OWNER | REGISTERED DATE | THE NUMBER OF THE HIERARCHY STAGE | DATA BASE INFORMATION OR DOCUMENT TYPE INFORMATION | ACCESS RIGHT INFORMATION | ICON INFORMATION |
|---|---|---|---|---|---|---|---|
| R29 | CLASSIFICATION C4 | USER 1 | MAY 1, 1992 | 2 | EXISTENCE OF A RETRIEVAL LIST | | |
| R30 | CLASSIFICATION C5 | USER 1 | MAY 1, 1992 | 2 | EXISTENCE OF A RETRIEVAL LIST | | |
| R31 | --- | --- | --- | --- | --- | --- | --- |
| R32 | CLASSIFICATION C6 | USER 1 | MAY 1, 1992 | 2 | EXISTENCE OF A RETRIEVAL LIST | | |
| R33 | DOCUMENT D1 | USER 2 | JUNE 1, 1992 | 99 | WORD PROCESSOR 1 | | |
| R34 | --- | --- | --- | --- | --- | --- | --- |
| R35 | DOCUMENT D2 | USER 2 | JUNE 1, 1992 | 99 | WORD PROCESSOR 2 | | |
| R36 | DOCUMENT D3 | USER 2 | JUNE 1, 1992 | 99 | WORD PROCESSOR 3 | | |

FIG. 5

| CLASSIFICATION PASS | NAME OF CLASSIFICATION OR DOCUMENT | OWNER | REGISTERED DATE | THE NUMBER OF THE HIER- ARCHY STAGE | ITEM 1 | ITEM 2 | ... | ITEM N | |
|---|---|---|---|---|---|---|---|---|---|
| | CLASSIFICATION C1 | USER 1 | APRIL 1, 1992 | 1 | | | | | R51 |
| | CLASSIFICATION C2 | USER 2 | APRIL 1, 1992 | 1 | | | | | R52 |
| | ............ | ...... | ......... | ... | | | | | R53 |
| | CLASSIFICATION C3 | USER 3 | APRIL 1, 1992 | 1 | | | | | R54 |
| CLASSIFICATION C1 | CLASSIFICATION C4 | USER 1 | MAY 1, 1992 | 2 | | | | | R55 |
| CLASSIFICATION C1 | CLASSIFICATION C5 | USER 1 | MAY 1, 1992 | 2 | | | | | R56 |
| ............... | ............ | ...... | ......... | ... | | | | | R57 |
| CLASSIFICATION C1 | CLASSIFICATION C6 | USER 1 | MAY 1, 1992 | 2 | | | | | R58 |
| CLASSIFICATION C1 | DOCUMENT D1 | USER 2 | JUNE 1, 1992 | 99 | | | | | R59 |
| ............... | ............ | ...... | ......... | ... | | | | | R60 |
| CLASSIFICATION C1 | DOCUMENT D2 | USER 2 | JUNE 1, 1992 | 99 | | | | | R61 |
| CLASSIFICATION C1 | DOCUMENT D3 | USER 2 | JUNE 1, 1992 | 99 | | | | | R62 |
| CLASSIFICATIONS C1, C4 | CLASSIFICATION C7 | USER 1 | MAY 1, 1992 | 3 | | | | | R63 |
| CLASSIFICATIONS C1, C4 | CLASSIFICATION C8 | USER 1 | MAY 1, 1992 | 3 | | | | | R64 |
| ............... | ............ | ...... | ......... | ... | | | | | R65 |
| CLASSIFICATIONS C1, C4 | CLASSIFICATION C9 | USER 1 | MAY 1, 1992 | 3 | | | | | R66 |
| CLASSIFICATIONS C1, C4 | DOCUMENT D4 | USER 3 | JUNE 1, 1992 | 99 | | | | | R67 |
| CLASSIFICATIONS C1, C4 | DOCUMENT D5 | USER 3 | JUNE 1, 1992 | 99 | | | | | R68 |
| ............... | ............ | ...... | ......... | ... | | | | | R69 |
| CLASSIFICATIONS C1, C4 | DOCUMENT D6 | USER 3 | JUNE 1, 1992 | 99 | | | | | R70 |
| CLASSIFICATIONS C1, C4, C7 | CLASSIFICATION C10 | USER 1 | MAY 1, 1992 | 4 | | | | | R71 |
| CLASSIFICATIONS C1, C4, C7 | CLASSIFICATION C11 | USER 1 | MAY 1, 1992 | 4 | | | | | R72 |
| ............... | ............ | ...... | ......... | ... | | | | | R73 |
| CLASSIFICATIONS C1, C4, C7 | CLASSIFICATION C12 | USER 1 | MAY 1, 1992 | 4 | | | | | R74 |
| CLASSIFICATIONS C1, C4, C7 | DOCUMENT D7 | USER 4 | JULY 1, 1992 | 99 | | | | | R75 |
| CLASSIFICATIONS C1, C4, C7 | DOCUMENT D8 | USER 4 | JULY 1, 1992 | 99 | | | | | R76 |
| ............... | ............ | ...... | ......... | ... | | | | | R77 |
| CLASSIFICATIONS C1, C4, C7 | DOCUMENT D9 | USER 4 | JULY 1, 1992 | 99 | | | | | R78 |
| CLASSIFICATIONS C1, C4, C7, C10 | DOCUMENT D10 | USER 5 | AUG. 1, 1992 | 99 | | | | | R79 |
| CLASSIFICATIONS C1, C4, C7, C10 | DOCUMENT D11 | USER 5 | AUG. 1, 1992 | 99 | | | | | R80 |
| ............... | ............ | ...... | ......... | ... | | | | | R81 |
| CLASSIFICATIONS C1, C4, C7, C10 | DOCUMENT D12 | USER 5 | AUG. 1, 1992 | 99 | | | | | R82 |

ELECTRONIC DOCUMENT FILING SYSTEM FOR REGISTERING AND RETRIEVING A PLURALITY OF DOCUMENTS

CROSS-REFERENCES TO RELATED APPLICATIONS

This application is a continuation-in-part of U.S. patent application Ser. No. 08/194,604 filed on Feb. 10, 1994, now abandoned.

BACKGROUND OF THE INVENTION

1. Field of the Invention

The present invention relates to an electronic document filing system in which a plurality of documents are processed by registering, preserving, managing and retrieving the documents.

2. Description of the Related Art

An electronic document filing system has been recently developed for the purpose of efficiently performing an office work, reducing a volume of consumed paper or minimizing a work space in an office, so that not only workers are assigned to specially input or manage documents but also general workers operate the system. Therefore, the improvement of functions and operations in the electronic document filing system have been required with the spread of the system in many offices. For example, the system is required to be applied to various types of businesses or documents. Also, the change from a common management system of documents written in the electronic document filing system to a private management system of the documents has been recently required.

2.1. Previously Proposed Art

A conventional electronic document filing system is described.

In a conventional electronic document filing system, a page or a document consisting of a single file is treated as a processing unit, and each of documents is registered, preserved, managed and retrieved. For example, a piece of retrieval information Ir is provided for a document D1, and the document D1 is retrieved in a retrieving process by detecting the retrieval information Ir. Thereafter, a displaying operation is performed to display each of retrieved pages or each of retrieved documents.

Also, Katz discloses method and apparatus for generating and utilizing annotations to facilitate computer text retrieval in U.S. Pat. No. 5,309,359. In this patent, at least selected text subdivisions are annotated with natural language questions, assertions or noun phases. Annotations are, if required, converted into a structure form and are stored in that form. Thereafter, an entire article or book is searched for relevant text subdivisions while entering a query in natural language or structure form, natural language queries are converted into structure form, the structured form query is matched against stored annotations, and text subdivisions connected to matched annotations are retrieved.

Also, Mori discloses a structured data classification device in U.S. Pat. No. 5,418,946. In this patent, when a retrieval condition designating unit designates "data to be retrieved" and "retrieval condition" as data on retrieval of a document and a classification attribute designating unit designates a "component's name" (classification attribute) as data on classification of the document, a structured document retrieving unit first retrieves a structured document group among a plurality of structured document stored in a structured document storing unit on the basis of the designated "data to be retrieved" and "retrieval condition". Thereafter, the structured document retrieving unit transfers the structured document group to a structured document classifying unit, which classifies the structured document group on the basis of the designated "component's name". Thereafter, the result of the classification is displayed on a displaying unit. Thus, by designating the components constituting a structured document by their component's names, a plurality of structured document is retrieved and classified on a real time basis.

In cases where the technical idea of Katz and the technical idea of Mori are combined, when an entire article or book is searched for relevant text subdivisions connected to matched annotations, a group of text subdivisions (or a structured document group) matching with a retrieval condition is stored in a virtual folder and is automatically classified in a classification structure.

2.2. Problems To Be Solved By The Invention

However, there is a drawback that a document consisting of a plurality of files cannot be processed in the conventional electronic document filing system. Also, because a group of documents cannot be processed as a logical set such as a type of classification, there is another drawback that a series of operations in which various documents and various types of classifications are hierarchically classified (or systematized) in a hierarchical structure, a group of documents is registered in one type of classification, pieces of attribute information of the documents relating to the same type of classification are displayed in a list at high speed and one of the documents of which the attribute information is displayed is retrieved cannot be performed.

Also, in the conventional electronic document filing system, because the retrieval operation is basically limited to the documents, there is another drawback that an operation for retrieving a group of documents registered in one type of classification cannot be performed.

In addition, even though retrieval information including classifying information is provided for a group of documents and one type of classification characterized by the classifying information is assumed for the group of documents in some degree, because the retrieval information is used for one type of classification, a hierarchical structure of classifications is limited, and a volume of retrieval information independently provided for documents and classifications is considerably limited.

Also, even though the technical idea of Katz and the technical idea of Mori are combined, because each annotation corresponds to one subdivision or each classification attribute corresponds to one document, in cases where a user desires to modify the classification of a plurality of documents in the classification structure, it is required that each classification attribute corresponding to one document is rewritten and a new classification structure is made after the old classification structure is abandoned. Therefore, in cases where the user desires to modify the classification of a plurality of documents, it is troublesome to newly make a classification structure.

SUMMARY OF THE INVENTION

An object of the present invention is to provide, with due consideration to the drawbacks of such a conventional electronic document filing system, an electronic document filing system in which a plurality of documents are arbitrarily classified in a hierarchical structure regardless of attributes of the documents and the documents are easily preserved, retrieved and renewed.

The above object is achieved by the provision of an electronic document filing system, comprising:

a plurality of documents, each of the documents comprising:
- a contents file block for storing a plurality of document files indicating contents of one document;
- a document attribute information file for storing a piece of document attribute information designating one or more document attributes peculiar to the document, the document attributes expressing common attributes of the document files to characterize the document; and
- a document directory for placing the contents file box and the document attribute information file on a hierarchy stage of a hierarchical structure;

a plurality of types of classifications, each of the types of classifications comprising:
- a classification attribute information file for storing a piece of classification attribute information designating one or more classification attributes of one type of classification having no connection with contents of any document, the type of classification being characterized by the classification attributes; and
- a classification directory for placing the classification attribute information file on a hierarchy stage of the hierarchical structure;

document and classification managing means for preparing the hierarchical structure composed of a plurality of hierarchy stages, registering one or more documents and one or more types of classifications characterized by a common attribute on a first hierarchy stage on the basis of the classification attribute information, which designates the common attribute and is stored in one classification attribute information file of one type of classification registered on a second hierarchy stage higher than the first hierarchy stage by one hierarchy stage, for each hierarchy stage, and managing the plurality of documents and the plurality of types of classifications in the hierarchical structure; and process control means for controlling the processing of each document managed in the hierarchical structure by the document and classification managing means to retrieve one document characterized by the document attributes as a minimum processing unit and renew one or more documents or one or more types of classifications.

In the above configuration, each of documents is expressed by a plurality of document files indicating contents of the document, a piece of document attribute information designating one or more document attributes peculiar to the document and a document directory. The document is characterized by the document attributes. Also, each of types of classifications is expressed by a piece of classification attribute information designating one or more classification attributes of the type of classification and a classification directory. The type of classification is characterized by the classification attributes.

In the document and classification managing means, a hierarchical structure composed of a plurality of hierarchy stages is prepared, and one or more documents and one or more types of classifications characterized by a common attribute are registered on a first hierarchy stage of the hierarchical structure on condition that the common attribute is designated by one classification attribute information stored in one classification attribute information file of one type of classification and the type of classification is registered on a second hierarchy stage higher than the first hierarchy stage by one hierarchy stage. Therefore, a plurality of documents can be systematized in the hierarchical structure.

Thereafter, each document characterized by the document attributes is processed as a minimum processing unit under the control of the process control means.

Accordingly, each document can be logically registered, preserved, retrieved and renewed at high speed while tracing a plurality of types of classifications one after another from an upper hierarchy stage to a lower hierarchy stage in the hierarchical structure.

Also, because each document is characterized by the document attributes, even though contents of each document are indicated by a plurality of document files, each document can be logically registered, preserved, retrieved and renewed as a minimum processing unit.

Also, because a common attribute of one or more documents registered on a first hierarchy stage of the hierarchical structure is designated by one classification attribute information stored in one classification attribute information file of one type of classification which is registered on a second hierarchy stage higher than the first hierarchy stage by one hierarchy stage, the documents can be logically processed as a set under the control of the process control means. Therefore, a user can select a desired document at high speed from among a large number of documents.

Also, though the document attributes of each document cannot be arbitrarily set because the document attributes are peculiar to the document, because the classification attributes of each type of classification have no connection with contents of any document, the classification attributes indicated by the classification attribute information can be arbitrarily set. Therefore, in cases where a user desires to rearrange one or more particular documents registered in the hierarchy structure regardless of contents of the particular documents, a particular type of classification relating to a piece of particular classification attribute information, which indicates a particular classification attribute common to the particular documents, is newly registered in a particular hierarchy stage, and the registration of the particular documents is changed to a hierarchy stage lower than the particular hierarchy stage by one hierarchy stage. Accordingly, one or more documents can be arbitrarily rearranged in the hierarchical structure regardless of the contents of the documents.

BRIEF DESCRIPTION OF THE DRAWINGS

The objects, features and advantages of the present invention will be apparent from the following description taken in conjunction with the accompanying drawings, in which:

FIG. 3A shows a typical structure of a classification attribute information file arranged in the hierarchical management structure shown in FIG. 2;

FIG. 3B shows a typical structure of a document attribute information file arranged in the hierarchical management structure shown in FIG. 2;

FIG. 3C shows a typical structure of a list file arranged in the hierarchical management structure shown in FIG. 2;

FIG. 5 shows pieces of retrieval information registered in each of retrieval row regions of a data base memory shown in FIG. 4 in tabular form.

DETAILED DESCRIPTION OF THE EMBODIMENTS

Preferred embodiments of an electronic document filing system according to the present invention are described with reference to drawings.

A first embodiment is described with reference to FIGS. 1, 2 and 3.

Figure 1:
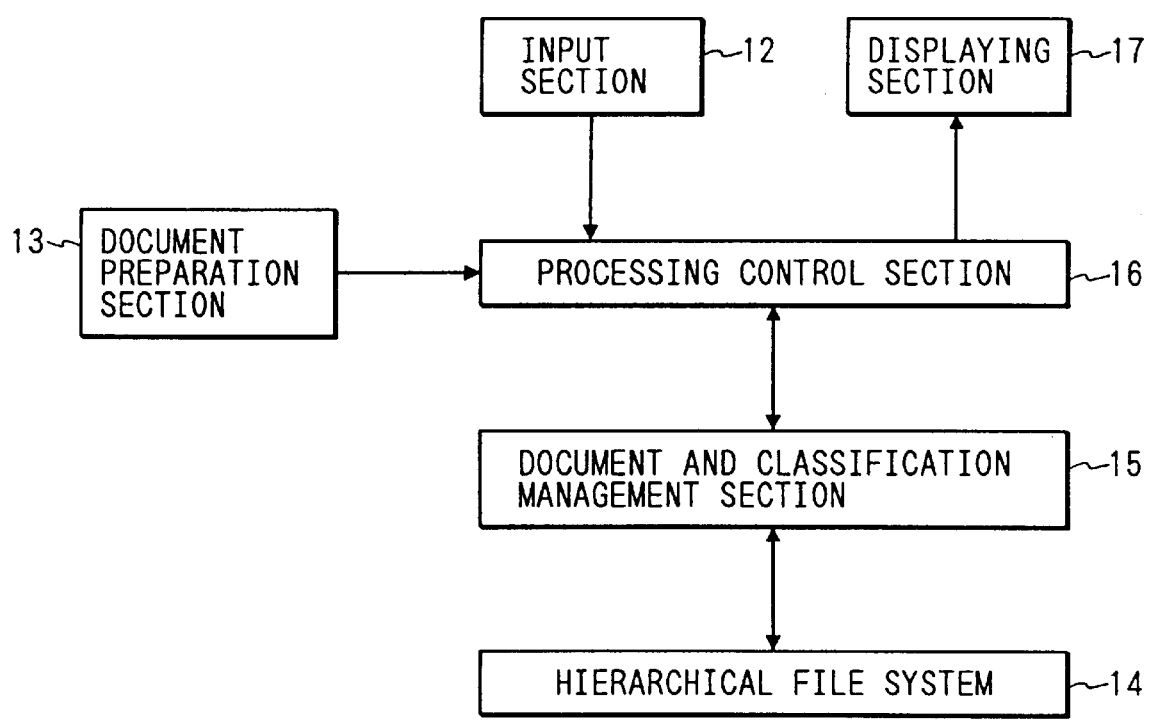
FIG. 1 is a block diagram showing a configuration of an electronic document filing system according to a first embodiment of the present invention.

FIG. 1 is a block diagram showing a configuration of an electronic document filing system according to a first embodiment of the present invention.

As shown in FIG. 1, an electronic document filing system 11 comprises an input section 12 for receiving various pieces of input information such as a document request for the registration of a document, a classification request for the registration of a type of classification, a list request for the displaying of pieces of attribute information in a list form, a copy request for the copy of a document or a type of classification, a piece of classification place information designating a place in which a type of classification is registered, a piece of document place information designating a place in which a document is registered and a piece of list place information designating a place in which a listing file is preserved, a document preparation section 13 for making out a document with a document preparation tool such as an editor, a word processor, a picture editing tool or a list preparing tool, a hierarchical file system 14 for preserving documents and various type of classifications in a hierarchical management structure, a document and classification management section 15 for managing the hierarchical management structure of the hierarchical file system 14 to hierarchically register documents and various types of classifications, a processing control section 16 for controlling the processing of documents and types of classifications performed in the sections 12, 13, 14 and 15 to hierarchically register the documents and the types of classifications, and a displaying section 17 for displaying various results of operations performed in the sections 14, 15 and 16.

Figure 2:
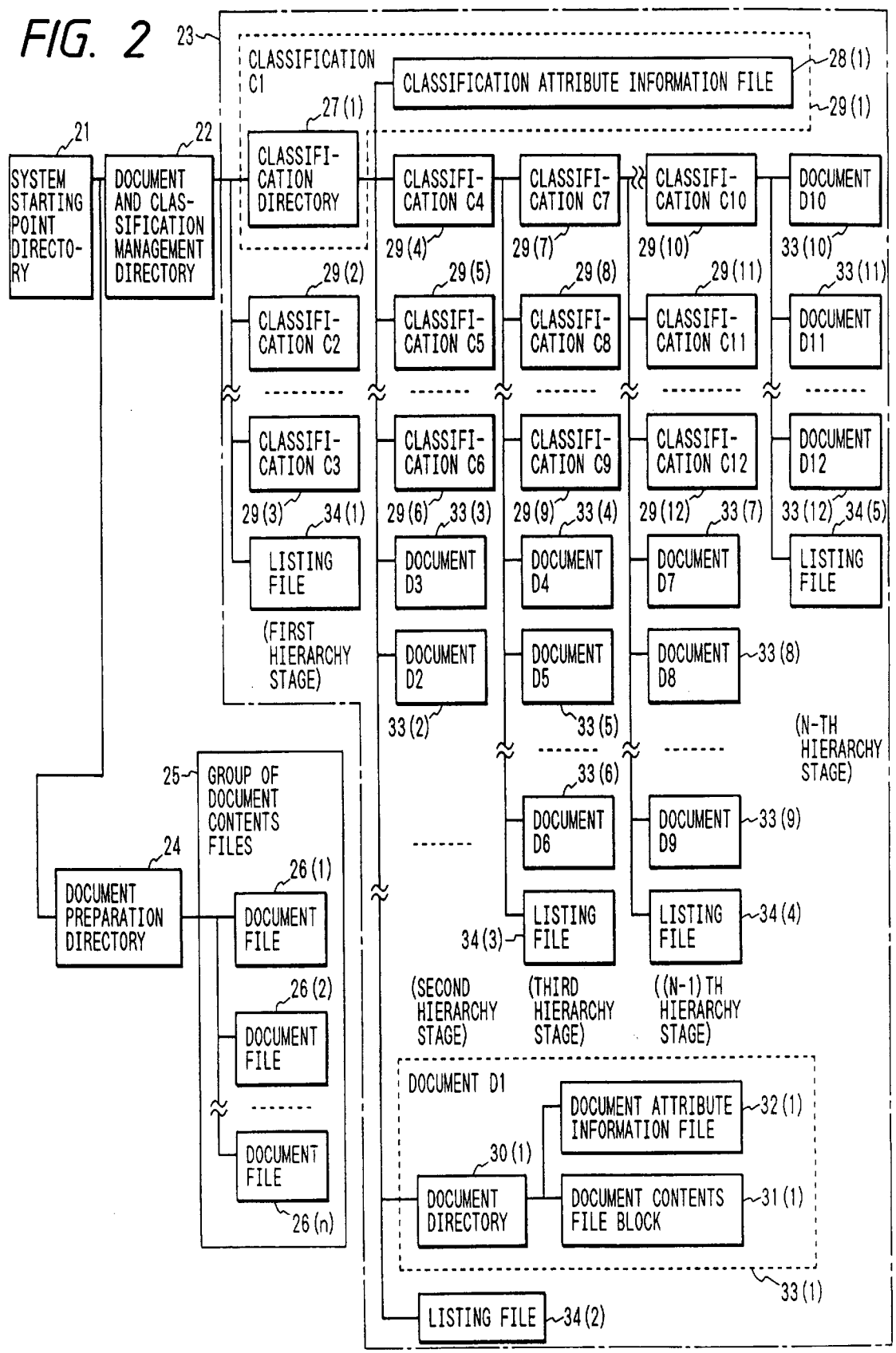
FIG. 2 is a block diagram showing a hierarchical management structure of a hierarchical file system arranged in the electronic document filing system shown in FIG. 1.

FIG. 2 is a block diagram showing a hierarchical management structure of the hierarchical file system 14 arranged in the electronic document filing system 11.

As shown in FIG. 2, the hierarchical file system 14 comprises a system starting point directory 21 denoting a starting point of the operation of the hierarchical file system 14, a document and classification management directory 22 denoting a starting point of the management of a plurality of documents and a plurality of types of classifications, a hierarchical management structure 23 placed on stages lower than that of the document and classification management directory 22 for hierarchically preserving the documents and the types of classifications, a document preparation directory 24 denoting a starting point of the preparation of a document for operating the document preparation tool placed in the document preparation section 13 to make out a document which is composed of a group of document contents files 25 having a set of document files 26a, 26b, . . . , 26n. In each of document files, a plain text, a text made out by using a word processor, image data, ruled line data or structure data required to structurally describe each of the texts is written. Therefore, the document made up in the document preparation section 13 is composed of various types of document files in which text and data are written according to different formats.

The hierarchical management structure 23 comprises many hierarchy stages on which a plurality of documents and a plurality of types of classifications utilized to hierarchically classify the documents are preserved. In detail, a plurality of classification directories 27(i) (i is an integral number) respectively making a type of classification in a hierarchical structure are arranged on each of the hierarchy stages ranging from a first hierarchy stage to an (n-1)-th hierarchy stage, and each of the classification directories 27(i) is accompanied with a classification attribute information file 28(i) in which pieces of classification attribute information characterizing the classification are stored. The classification attribute information are used to merely classify a plurality of documents regardless of document attributes peculiar to the documents. Therefore, arbitrary attribute information can be used as the classification attribute information.

Also, each of the classification directories 27(i) is accompanied with a group of documents. The group of documents is logically systematized as a set on the basis of the classification attribute information stored in the classification attribute information file 28(i). Therefore, each type of classification placed in a classification region 29(i) is composed of the classification directories 27(i) and the classification attribute information file 28(i), and the attributes of each type of classification are expressed by the classification attribute information of the classification attribute information file 28(i). Also, all types of classification placed in the classification regions 29(i) are hierarchically arranged in the hierarchical management system 23.

Also, a plurality of document directories 30(j) (j is an integral number) respectively making a type of document in the hierarchical structure are arranged on each of the hierarchy stages ranging from a second hierarchy stage to an n-th hierarchy stage in the hierarchical management system 23. Each of the document directories 30(j) is accompanied with a group of document contents files arranged in a document contents file block 31(j), and the group of document contents files corresponds to contents of a document made out in the document preparation section 13. Also, each of the document directories 30(j) is accompanied with a document attribute information file 32(j) in which pieces of document attribute information expressing attributes of the document are stored. That is, the document attribute information are used to systematize a plurality of documents in the hierarchical management system 23 in dependence on documents attributes peculiar to the documents. In this case, each document directory 30(j) makes the document attribute information file 32(j) connect with the group of document contents files made out in the document preparation section 13.

Therefore, each document placed in a document region 33(j) is composed of the document directory 30(j), the group of document contents files arranged in a document contents file block 31(j) and the document attribute information file 32(j).

Accordingly, each document is made up from a plurality of document contents files, the attributes of the document are expressed by the document attribute information, and each document is processed (that is, stored, preserved, managed and retrieved) as a minimum processing unit for the processing in the hierarchical management system 23. In other words, each of the document contents files is not logically processed as a minimum processing unit.

Also, a plurality of documents arranged on a common hierarchy stage are logically systematized as a set on the basis of the classification attribute information which are stored in a classification attribute information file 28 of a type of classification arranged on a hierarchy stage higher than the common hierarchy stage by one stage. Therefore, the documents arranged on the common hierarchy stage are logically processed as a set because a common attribute of the documents is expressed by the classification attribute information.

In addition, a listing file 34(k) is arranged on each of the hierarchy stages ranging from the first hierarchy stage to the n-th hierarchy stage in the hierarchical management structure 23. In each of the listing file 34(k), pieces of listing information of documents and types of classifications placed on the same hierarchy stage are stored. The listing information are selectively obtained from the attribute information stored in the attribute information files 28(i) and 32(i).

In the above configuration of the electronic document filing system 11, a classification registering operation for registering a type of classification C1 in the hierarchical management structure 23 is initially described.

A classification request for the registration of a type of classification C1 is input to the input section 12 by a user with a keyboard or a mouse. Also, various pieces of information relating to the classification C1 such as a piece of classification place information designating a place in which the classification C1 is registered and a name of the classification C1 are input to the input section 12. Thereafter, the classification request and the information are transferred to the processing control section 16. In the section 16, a piece of classification attribute information required to register the classification C1 is prepared. Thereafter, a request for the registration of the classification C1 is transferred from the section 16 to the document and classification management section 15. In the section 15, a current processing is directed to the system starting point directory 21 of the hierarchical file system 14, and the system 14 is operated. Thereafter, the current processing is transferred to the document and classification management directory 22, and an objective classification directory corresponding to the place designated by the classification placed information is searched while the current processing proceeds to lower hierarchy stages in the hierarchical management structure 23 under the management of the section 15.

In cases where the classification C1 is planned to be registered on the first hierarchy stage, the objective classification directory is the document and classification management directory 22 which is positioned on a hierarchy stage higher than the first hierarchy stage by one hierarchy stage. Therefore, after the directory 22 is found out as the objective classification directory, a classification directory 27(1) is added on the first hierarchy stage lower than that of the directory 22 by one hierarchy stage. Thereafter, a classification attribute information file 28(1) placed by the classification directory 27(1) is added on the second hierarchy stage lower than that of the directory 27(1) by one hierarchy stage, and the classification attribute prepared in the processing control section 16 is stored in the file 28(1). Therefore, the type of classification C1 composed of the classification directory 27(1) and the classification attribute information file 28(1) is added on the first hierarchy stage of the hierarchical management structure 23. The type of classification C1 is registered in a classification region 29(1).

In the same manner, a type of classification C2 registered in a classification region 29(2) and a type of classification C3 registered in a classification region 29(3) are, for example, added on the first hierarchy stage, so that the first hierarchy stage of the hierarchical management structure 23 is formed. Also, the classification directory 27(1) is accompanied with types of classifications C4, C5 and C6 registered in classification regions 29(4), 29(5) and 29(6), and the types of classifications C4, C5 and C6 are added on the second hierarchy stage. In this case, a common attribute of the types of classifications C4, C5 and C6 is expressed by the attribute information stored in the classification attribute information file 2891).

Accordingly, various types of classifications registered in the electronic document filing system 11 can be hierarchically systematized in the hierarchy management structure 23. Also, a common attribute of types of classifications which are registered in the classification regions 29 arranged at a hierarchy stage Ni can be generally expressed by pieces of classification attribute information which are stored in a classification attribute information file 28 of a classification region 29 arranged on a higher hierarchy stage Ni-1.

Also, because the classification attribute information are determined regardless of the document attributes peculiar to the documents, in cases where a user desires to rearrange a plurality of particular documents placed on various hierarchy stages according to documents attributes of the particular documents as a group of particular documents placed on the same hierarchy stage in the hierarchy management structure 23, the user adds a particular type of classification in the hierarchy management structure 23 in which a particular classification attribute common to the particular documents is stored in a classification attribute information file, and the particular documents are rearranged on the common hierarchy stage according to the particular classification attribute regardless of the document attributes of the particular documents. Therefore, the particular documents can be rearranged without changing the document attributes of the particular documents.

A typical structure of the classification attribute information file 28(i) arranged in the hierarchical management structure 23 is shown in FIG. 3A.

As shown in FIG. 3A, the type of classification C1 is named a classification C1 as written in a record field R1, an owner of the classification C1 is a User 1 as written in a record field R2, a registered data of the classification C1 is Apr. 1, 1992 as written in a record field R3, and the number of the hierarchy stage is specified to 1 as written in a record field R4. The number of the hierarchy stage is counted from the first hierarchy stage to the n-th hierarchy stage. Also, a piece of data base information denoting the existence of a retrieval list is stored in a record field R5. The data base information is utilized to perform a retrieval processing in which a type of classification is retrieved in the hierarchical management structure 23. The detail of the retrieval processing is described in a second embodiment. In addition, a piece of access permission information denoting a right to access the classification C1 is stored in a record field R6, a piece of icon information of the classification C1 is stored in a record field R7, a piece of user information is stored in a record field R8, and pieces of other classification attribute information are stored in record fields R9 to R14. Each of the other classification attribute information has no connection with a document attribute peculiar to any document, and it is applicable that various types of attribute information are stored in each classification attribute information file 28(i).

The attribute information stored in each classification attribute information file 28(i) is not limited to an attribute peculiar to any document registered in the hierarchical management structure 23. Therefore, even though a plurality of documents are once systematized on a plurality of hierarchy stages of the hierarchical management structure 23 according to the attribute information stored in the classification attribute information files 28(i), in cases where a user newly adds one or more types of classifications in the hierarchical management structure 23, the plurality of documents can be rearranged in the hierarchical management structure 23 according to the classification attribute information store in one or more classification attribute information files 28(i) of the types of classifications newly added. In this case, the rearrangement of the documents can be performed without altering the document attribute information stored in the document attribute information files 32(i) of the documents.

Accordingly, in cases where the user desires to rearrange a plurality of documents according to a new attribute after the documents are arranged in the hierarchical management structure 23, the user can easily rearrange the documents in the hierarchical management structure 23 by adding one type of classification characterized by the new attribute without changing any document attribute information.

Next, a document registering operation for registering a document D1 in the hierarchical management structure 23 is described.

A document request for the registration of a document D1 is input to the input section 12 by the user with the keyboard or the mouse. Thereafter, the document request is transferred to the processing control section 16. In the section 16, a current processing is directed to the system starting point directory 21 of the hierarchical file system 14, and the system 14 is operated. Thereafter, the current processing is transferred to the document preparation directory 24 to operate the document preparation tool placed in the document forming section 13. Thereafter, the preparation of the document D1 in the section 13 is watched by the section 16. When the document D1 is made out, the contents of the document D1 is edited in a set of document files 26a, 26b, . . . , and 26n of the group of document contents files 25 to logically process the document D1 as a set, and a request for pieces of input information is transferred to the section 16 to the input section 12. Therefore, the input information relating to the document D1 such as a piece of document place information designating a place in which the document D1 is registered and a name of the document D1 are input to the input section 12. Thereafter, the input information are transferred to the processing control section 16. In the section 16, a piece of document attribute information required to register the document D1 in the system 23 is prepared. Thereafter, the document request for the registration of the document D1 is transferred from the section 16 to the document and classification management section 15. In the section 15, a current processing is directed to the system starting point directory 21 of the hierarchical file system 14, and the system 14 is operated. Thereafter, the current processing is transferred to the document and classification management directory 22, and an objective classification directory corresponding to the place designated by the document place information is searched while the current processing proceeds to lower hierarchy stages in the hierarchical management structure 23 under the management of the section 15. The attributes of the document D1 are expressed by a piece of classification attribute information which is stored in a classification attribute information file 28 of the objective classification directory.

In cases where the document D1 is planned to be registered on the second hierarchy stage, the objective classification directory is the classification directory 27(1) which is placed on the first hierarchy stage higher than the second hierarchy stage by one hierarchy stage. Therefore, after the classification directory 27(1) is found out as the objective classification directory, a document directory 30(1) is added on the second hierarchy stage placed just downstream the classification directory 27(1) by one hierarchy stage. Thereafter, a document contents file block 31(1) placed by the document directory 30(1) is added, and the contents of the documents dl edited in the set of files 26a, 26b, . . . , and 26n of the group of document contents files 25 is stored in the document contents file block 31(1) to logically process the document D1 as a set. In addition, a document attribute information file 3291) placed by the document directory 30(1) is added, and the document attribute information prepared in the processing control section 16 is stored in the file 3291). Therefore, the document D1 composed of the document directory 30(1), the document contents file block 31(1) and the document attribute information file 32(1) is added on the second hierarchy stage of the hierarchical management structure 23. The document D1 is registered in a document region 33(1).

In the same manner, documents D2 and D3 registered in document regions 33(2) and 33(3) are, for example, added on the second hierarchy stage. Therefore, the classification directory 2791) is accompanied with document directories 30 of the document regions 3391), 3392) and 33(3). That is, a common attribute of the documents D1, D2 and D3 is expressed by the attribute information stored in the classification attribute information file 2891). Therefore, the documents D1, D2 and D3 are logically processed as a set.

Accordingly, even though a document made out in the document preparation section 13 consists of a plurality of document files, the document can be registered in the electronic document filing system 11 to logically process (that is, stored, preserved, managed and retrieved) the document as a minimum processing unit. In other words, each of the document files is not logically processed as a minimum processing unit.

Also, because various types of classifications are hierarchically systematized in the hierarchical management structure 23 and because a common attribute of a group of documents registered on the same hierarchy stage Ns is expressed by pieces of attribute information which are stored in a classification attribute information file 28 placed by a classification directory 27 on a hierarchy stage higher than the hierarchy stage Ns by one hierarchy stage, the group of documents on the same hierarchy stage Ns can be logically processed as a set. Therefore, even though a large number of documents are registered in the hierarchy management structure 23, a desired document registered can be easily retrieved in a retrieving operation at high speed.

A typical structure of the document attribute information file 32(j) arranged in the hierarchical management structure 23 is shown in FIG. 3B.

As shown in FIG. 3B, the document D1 is named a document D1 as written in a record field R15, an owner of the document D1 is a User 2 as written in a record field R16, a registered data of the document D1 is Jun. 1, 1992 as written in a record field R17, and the number of the hierarchy stage for the document D1 is set to 99 as written in a record field R18. Because the number of the lowest hierarchy stage given to the classifications is 98 (n-1=98) in the first embodiment, the hierarchy number for the documents 30(j) is fixed to 99 for convenience. That is, in cases where the hierarchy number is 99, it is promptly realized that the document attribute information is listed. Also, a piece of document type information denoting a type of document preparation tool is stored in a record field R19. The document type information indicates that the document D1 is made out with a word processor 3. In addition, a piece of access permission information denoting a right to access the document D1 is stored in a record field R20, a piece of icon information of the document D1 is stored in a record field R21, a piece of user information is stored in a record field R22, and pieces of other document attribute information are stored in record fields R23 to R28. Each of the other document attribute information indicates document attributes peculiar to the document D1, and it is applicable that various types of attribute information are stored in each document attribute information file 32(j).

Next, a displaying operation for displaying pieces of attribute information of documents and types of classifications stored in a listing file F1 is described.

A list request for the display of pie ces of attribute information stored in a listing file F1 is input to the input section 12 by the user with the keyboard or the mouse. Also, various pieces of information such as a piece of list place information designating a place in which the listing file F1 is preserved are input to the input section 12. Thereafter, the list request and the information are transferred to the processing control section 16. In the section 16, a request for the display of the attribute information stored in the listing file F1 is transferred to the document and classification management section 15. In the section 15, a current processing is directed to the system starting point directory 21 of the hierarchical file system 14, and the system 14 is operated. Thereafter, the current processing is transferred to the document and classification management directory 22, and an objective classification directory corresponding to the place designated by the list place information is searched while the current processing proceeds to lower hierarchy stages in the hierarchical management structure 23 under the management of the section 15.

In cases where the listing file F1 is placed on the second hierarchy stage, the objective classification directory is the classification directory 27(1) which is placed on the first hierarchy stage higher than the second hierarchy stage by one hierarchy stage. Therefore, after the classification directory 27(1) is found out as the objective classification directory, the listing file 34(2) placed on the second hierarchy stage is found out as the listing file F1. Thereafter, pieces of attribute information listed in the listing file f1 are displayed in the displaying section 17 under the control of the processing control section 16.

FIG. 3C shows a typical structure of the listing file 27(k) arranged in the hierarchical management structure 23.

As shown in FIG. 3C, a name of a document or a type of classification, an owner, a registered date, the hierarchy number, a piece of data base information for a type of classification or a piece of document type information for a document, a piece of access permission information and a piece of icon information are selected as pieces of typical attribute information required to display the attribute information of documents and types of classifications placed on the same hierarchy stage, and the typical attribute information are listed in each of record fields R29 to R36. Also, each time a document or a type of classification is registered, the typical attribute information of the document or the type of registered is added in the listing file.

Accordingly, the user can watch pieces of typical attribute information in the displaying section 17 at high speed. Also, the user can easily find out a desired document to display the desired document in the displaying section 17 because the user can watch the typical attribute information of the desired document in the displaying section 17.

The typical attribute information is not limited to those shown in FIG. 3C, and the attribute information listed in the listing file can be arbitrarily selected according to the purpose of the electronic document filing system 11.

Also, the listing files 34(k) are not necessarily required. That is, in cases where no listing file is placed on the second hierarchy stage in the hierarchical management system 23, the classification attribute information files 28(i) (i=4,5 and 6) of all classification regions 29(i) arranged on the second hierarchy stage are read, and the document attribute information files 32(j) (j=1,2 and 3) of all document regions 33(j) arranged on the second hierarchy stage are read. Thereafter, the typical attribute information stored in the classification attribute information files 28(i) and the document attribute information files 32(i) are selectively taken out, and the typical attribute information selectively taken out are transferred to the processing control section 10. Thereafter, the typical attribute information is displayed in the displaying section 17 under the control of the section 16 in a tabular form.

Accordingly, even though no listing file is placed in the hierarchical management system 23, the typical attribute information can be reliably displayed.

Next, a copy operation for copying a document or a type of classification registered in the hierarchical management system 23 and registering the document or the type of classification copied is described.

A copy request for the copy of a document or a type of classification registered in the hierarchical management system 23 is input to the input section 12 by the user with the keyboard or the mouse. Also, a piece of copy place information designating a place in which the document or the type of classification are preserved is input to the input section 12, and a piece of register place information designating a place in which the document or the type of classification are planned to be registered is input to the input section 12. Thereafter, the copy request and the information are transferred to the processing control section 16 and the document and classification management section 15. In the section 15, a current processing is directed to the system starting point directory 21 of the hierarchical file system 14 to operate the system 14, and the current processing is transferred to the document and classification management directory 22. Thereafter, an objective classification directory corresponding to the place designated by the copy place information is found out in the same manner as the processing for registering a document or a type of classification, and a document or a type of classification planned to be copied is selected and copied. In this case, a piece of attribute information stored in a document attribute information file 32 or a classification attribute information 28 relating to the document or the type of classification copied is also copied. Thereafter, the document or the type of classification copied is registered in a document region 33 or a classification region 29 newly added in the same manner as the processing for registering a document or a type of classification according to the register place information. In addition, the attribute information copied is stored in a document attribute information file 32 or a classification attribute information file 28 newly added.

Next, a renewing operation for renewing a name of a document or a name of a type of classification registered in the hierarchical management system 23 is described.

When a renewing request for the renewal of a name of the document or a name of the type of classification and a new name of a document registered in a document region 33($j_0$)

or a new name of a type of classification registered a classification region 29($i_0$) is input to the input section 12 are input to the input section 12, the renewing request and the new name are transferred to the document and classification management section 15 through the processing control section 16. In the section 15, the document region 33($j_0$) or the classification region 29($i_0$) is found out, and the name of the document or the type of classification stored in an attribute information file 32($j_0$) or 28($i_0$) corresponding to the region 33($j_0$) or 29($i_0$) is changed to the new name. Also, the name stored in a listing file 34 placed on the same hierarchy stage as the region 33($j_0$) or 29($i_0$) is changed to the new name.

Next, a deleting operation for deleting a document or a type of classification registered in the hierarchical management system 23 is described.

When a deleting request for the deletion of a document or a type of classification registered in the document region 33($j_0$) or the classification region 29($i_0$) is input to the input section 12, the deleting request is transferred to the document and classification management section 15 through the processing control section 16. In the section 15, the document region 33($j_0$) or the classification region 29($i_0$) is found out, and a document directory 30($j_0$) or a classification directory 27($i_0$) and an attribute information file 32($j_0$) or 28($i_0$) corresponding to the region 33($j_0$) or 29($i_0$) is deleted. Also, a record field of a listing file 34 in which pieces of attribute information of the document or the type of classification are listed is deleted.

Accordingly, because a plurality of files are logically treated as a document, a document consisting of a plurality of files can be registered, preserved, managed and processed in the electronic document filing system 11. Also, because various types of classifications are hierarchically systematized in the hierarchical management structure 23, a group of document is treated as a logical set relating to a type of classification, and a document can be found out from a large number of documents at high speed by searching a type of classification intimately relating to the document.

Next, a second embodiment is described with reference to FIGS. 4 and 5.

Figure 4:
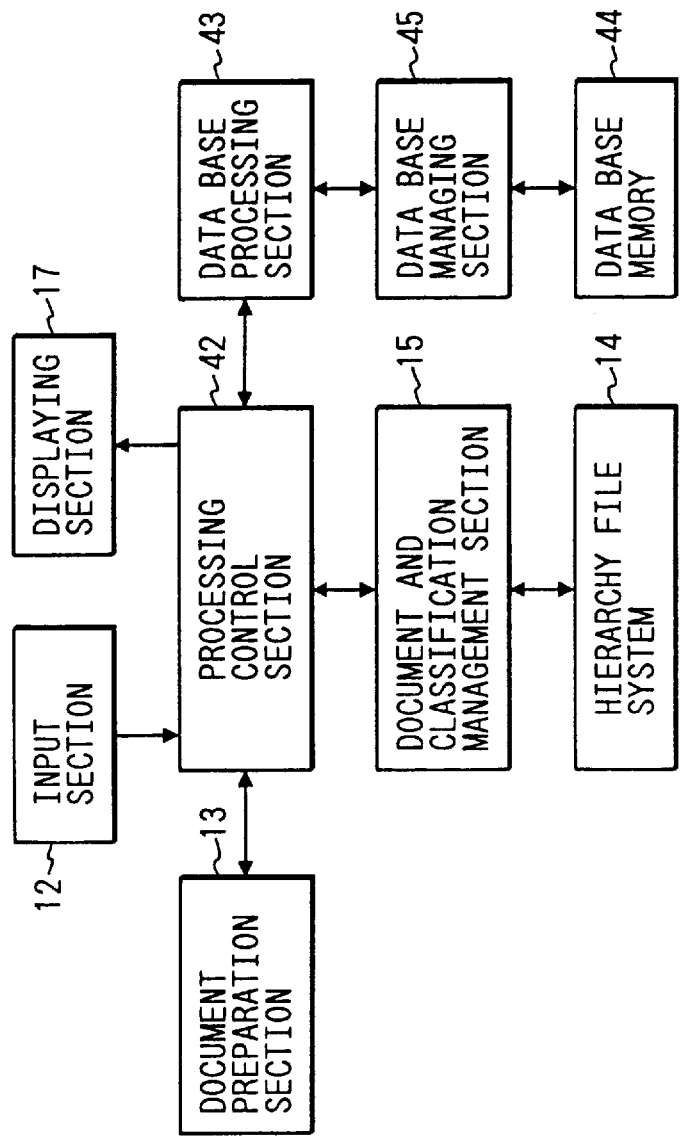
FIG. 4 is a block diagram showing a configuration of an electronic document filing system according to a second embodiment of the present invention.

FIG. 4 is a block diagram showing a configuration of an electronic document filing system according to a second embodiment of the present invention.

As shown in FIG. 4, an electronic document filing system 41 comprises the input section 12, the document preparation section 13, the hierarchical file system 14, the document and classification management section 15, the displaying section 17, a processing control section 42 for controlling the processing of a document made out in the document preparation section 13, controlling the processing of a type of classification and controlling the processing of a request for the retrieval of a document or a type of classification, a data base processing section 43 for designating pieces of retrieval information which are selected from pieces of attribute information stored in the document or classification attribute information file 28 or 32 and processing the retrieval information as a data base, a data base memory 44 for storing the retrieval information processed as the data base in the data base processing section 43, and a data base managing section 45 for managing the registration of the data base to the data base memory 44.

FIG. 5 shows pieces of retrieval information registered in each of retrieval row regions of the data base memory 44 in tabular form.

As shown in FIG. 5, a classification pass placed at a first column region R41, a name of a document or a type of classification placed at a second column region R42, an owner placed at a third column region R43, a registered data placed at a fourth column region R44 and a hierarchy number placed at a fifth column region R45 are registered as items of retrieval information. In addition, other items of retrieval information are registered at column regions R46 to R48. Also, a set of items of retrieval information is registered at each of retrieval row regions R51 to R82 to list pieces of attribute information of a document or a type of classification named in the region R42.

The classification pass denotes a retrieval item designating one or more types of classifications preserved in upper hierarchy stages than that of the document or the type of classification named at the region R42.

The name registered in the region R42 agrees with that registered in the region R1 or R15 of the classification or document attribute information file 28 or 32. The owner registered in the region R43 agrees with that registered in the region R2 or R16 of the classification or document attribute information file 28 or 32. The registered data registered in the region R44 agrees with that registered in the region R3 or R17 of the classification or document attribute information file 28 or 32. The hierarchy number registered in the region R45 agrees with that registered in the region R4 or R18 of the classification or document attribute information file 28 or 32. The items registered in the regions R41 to R45 are called typical items of retrieval information which are indispensably required to retrieve a document or a type of classification named at the region R42. The items of retrieval information registered at column regions R46 to R48 can be arbitrarily set.

In the above configuration of the electronic document filing system 41, a first registering operation for registering items of retrieval information of a type of classification C1 in the data base memory 44 is initially described.

When a classification request for the registration of a type of classification C1 to the hierarchical management structure 23 is input to the input section 12 by a user with a keyboard or a mouse, the type of classification C1 is registered in a classification region 29($i_0$) of the hierarchical management structure 23 in the same manner as in the first embodiment. Thereafter, when the registration of the type of classification C1 is completed, the processing control section 42 informs the data base processing section 43 of the completion of the registration. In the section 43, the name of the type of classification C1, the classification pass, the owner of the type of classification C1, the registered date and the hierarchical number are selected from pieces of classification attribute information stored in a classification attribute information file 28($i_0$) as typical items of retrieval information of the type of classification C1. Also, other items of retrieval information of the type of classification C1 are selected from the classification attribute information. Thereafter, the retrieval information are registered in a retrieval row region of the data base memory 44 as a data base of the type of classification C1 under the management of the data base management section 45.

Accordingly, when a type of classification is registered in the hierarchical management structure 23, the items of retrieval information of the type of classification can be automatically registered.

Also, because items of retrieval information of a type of classification registered in the data base memory 44 agree with pieces of classification attribute information of the type of classification preserved in a classification attribute information file 28, any type of classification can be reliably retrieved in a retrieving processing without inputting any piece of retrieval information.

Next, a second registering operation for registering items of retrieval information of a document D1 in the data base memory 44 is described.

When a document request for the registration of a document D1 to the hierarchical management structure 23 is input to the input section 12 by a user with a keyboard or a mouse, the document D1 is made out in the document preparation section 13, and the document D1 is registered in a document region $33(j_0)$ of the hierarchical management structure 23 in the same manner as in the first embodiment. Thereafter, when the registration of the document D1 is completed, the processing control section 42 informs the data base processing section 43 of the completion of the registration. Thereafter, the name of the document D1, the classification pass, the owner of the document D1, the registered date and the hierarchical number are selected from pieces of document attribute information stored in a document attribute information file $32(j_0)$ as typical items of retrieval information of the document D1. Also, other items of retrieval information are selected from the document attribute information. Thereafter, the retrieval information are registered in a retrieval row region of the data base memory 44 as a data base of the document D1 under the management of the data base management section 45.

Accordingly, when a document is registered in the hierarchical management structure 23, the items of retrieval information of the document can be automatically registered. In this case, even though the document consists of a plurality of document files, the document can be treated as a minimum processing unit. In other words, each of the document files is not treated as a minimum processing unit.

Also, because items of retrieval information of a document registered in the data base memory 44 agree with pieces of document attribute information of the document preserved in a document attribute information file 32, any document can be reliably retrieved in a retrieving processing without inputting any piece of retrieval information.

Next, a renewing operation for renewing an item of retrieval information stored in the data base memory 44 is described.

When a piece of retrieval information Ir of a document or a type of classification, a request for the registration of the retrieval information Ir, a column region information designating a register column region in which an item of retrieval information planned to be changed to the retrieval information Ir is stored, and a row region information designating a register row region in which items of retrieval information of the document or the type of classification are stored are input to the input section 12, the request for the registration of the retrieval information Ir and the information are transferred to the data base processing section 43 through the processing control section 42. Thereafter, the register column region designated by the column region information and the register row region designated by the row region information are specified in the data base processing section 43. Thereafter, the retrieval information Ir is registered at the register column region of the register row region under the management of the data base management section 45.

Accordingly, even though a user wishes to register a piece of retrieval information Ir which is not preserved in the hierarchical management structure 23, the retrieval information Ir can be arbitrarily registered.

Next, a retrieving operation for retrieving a document or a type of classification preserved in the hierarchical management structure 23 is described.

A retrieving request for the retrieval of a document or a type of classification and a piece of combined retrieval condition information required to specify a document or a type of classification desired by a user are input to the input section 12. The combined retrieval condition information is composed of a piece of column region information designating a column region Rr, a retrieval keyword utilized to select one or more items of retrieval information stored in the column region Rr designated by the column region information, a retrieval conditional expression utilized to select one or more items of retrieval information stored in the column region Rr designated by the column region information, and the like. Thereafter, the retrieving request and the combined retrieval condition information are transferred to the data base processing section 43 through the processing control section 42. In the section 43, a retrieval command is prepared according to the retrieval keyword and the retrieval conditional expression. Thereafter, the items of retrieval information stored in the column region Rr are checked with the retrieval command under the management of the data base management section 45 to select one or more items of retrieval information which satisfy the retrieval keyword and the retrieval conditional expression. Thereafter, one or more sets of items of retrieval information stored in the retrieval row regions in which the items of retrieval information selected are stored are transferred to the processing control section 42, and the sets of items of retrieval information are displayed in the displaying section 17.

Accordingly, because any document or any type of classification is treated as a processing unit, the user can easily retrieve a large number of documents and types of classifications at high speed to select a desired document or a desired type of classification.

Next, a copy operation for copying a document and pieces of retrieval information of the document or copying a type of classification and pieces of retrieval information of the type of classification is described.

When a copy request for the copy of a document or a type of classification registered in the hierarchical management structure 23 and other pieces of information are input to the input section 12, the document or the type of classification is copied to a specified place of the hierarchical management structure 23 in the same manner as the copy operation in the first embodiment. Thereafter, pieces of attribute information preserved in an attribute information file 28 or 32 relating to the document or the type of classification copied are read from the hierarchical management structure 23 under the control of the processing control section 42 and are stored to the data base memory 44 as items of retrieval information of the document or the type of classification.

Accordingly, when a document or a type of classification is copied, items of retrieval information of the document or the type of classification can be automatically registered to retrieve the document or the type of classification in the retrieving operation.

Next, a renewing operation for renewing a name of a document or a name of a type of classification registered in the hierarchical management system 23 and the data base memory 44 is described.

When a renewing request for the renewal of a name of a document or a name of a type of classification is input to the input section 12, the name of the document or the name of the type of classification registered in a document region 33 or a classification region 29 is changed to a new name in the same manner as the copy operation in the first embodiment.

Thereafter, the new name is read from the hierarchical management system 23 under the control of the processing control section 42 and is stored to the data base memory 44 as an item of retrieval information of the document or the type of classification.

Accordingly, when a name of a document or a name of a type of classification is renewed, the name registered in the data base memory 44 can be automatically renewed to retrieve the document or the type of classification in the retrieving operation.

Next, a deleting operation for deleting a document and pieces of retrieval information of the document or deleting a type of classification and pieces of retrieval information of the type of classification is described.

When a deleting request for the deletion of a document or a type of classification is input to the input section 12, the document registered in a document region 33 or the type of classification registered in a classification region 29 is deleted in the same manner as the deleting operation in the first embodiment. Also, the deleting request is transferred to the data base processing section 43 through the processing control section 42. Thereafter, items of retrieval information listed in a retrieval row region of the document or the type of classification are deleted under the control of the processing control section 42.

Accordingly, in cases where a document or a type of classification becomes unnecessary, not only the document or the type of classification but also items of retrieval information relating to the document or the type of classification can be deleted. Therefore, the unnecessary retrieval of an unnecessary document or an unnecessary type of classification can be omitted.

Having illustrated and described the principles of the present invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. An electronic document filing system, comprising:
   a plurality of documents, each of the documents comprising:
      a contents file block for storing a plurality of document files indicating contents of one document;
      a document attribute information file for storing a piece of document attribute information designating one or more document attributes peculiar to the document, the document attributes expressing common attributes of the document files to characterize the document; and
      a document directory for placing the contents file box and the document attribute information file on a hierarchy stage of a hierarchical structure;
   a plurality of types of classifications, each of the types of classifications comprising:
      a classification attribute information file for storing a piece of classification attribute information designating one or more classification attributes of one type of classification having no connection with contents of any document, the type of classification being characterized by the classification attributes; and
      a classification directory for placing the classification attribute information file on a hierarchy stage of the hierarchical structure;
   document and classification managing means for preparing the hierarchical structure composed of a plurality of hierarchy stages, registering one or more documents and one or more types of classifications characterized by a common attribute on a first hierarchy stage on the basis of the classification attribute information, which designates the common attribute and is stored in one classification attribute information file of one type of classification registered on a second hierarchy stage higher than the first hierarchy stage by one hierarchy stage, for each hierarchy stage, and managing the plurality of documents and the plurality of types of classifications in the hierarchical structure; and
   process control means for controlling the processing of each document managed in the hierarchical structure by the document and classification managing means to retrieve one document characterized by the document attributes as a minimum processing unit and renew one or more documents or one or more types of classifications.

2. An electronic document filing system according to claim 1, further comprising:
   a listing file registered on a particular hierarchy stage for storing the document attribute information stored in the document attribute information files of the documents registered on the particular hierarchy stage and the classification attribute information stored in the classification attribute information files of the classifications registered on the particular hierarchy stage; and
   displaying means for displaying the document attribute information and the classification attribute information stored in the listing file.

3. An electronic document filing system according to claim 1, further comprising:
   document preparation means for making a plurality of document files for each of the documents, the plurality of document files being stored in each of the contents file blocks of the documents.

4. An electronic document filing system according to claim 1, further comprising:
   data base means for storing pieces of retrieval information of the types of classifications and storing pieces of retrieval information of the documents;
   input means for receiving a retrieving request for the retrieval of a desired document or a desired type of classification; and
   data base processing means for designating pieces of classification attribute information stored in the classification attribute information files as the retrieval information of the types of classifications, designating pieces of document attribute information stored in the document attribute information files as the retrieval information of the types of documents, and retrieving the retrieval information stored in the data base means to select a piece of retrieval information of the desired document or the desired type of classification according to the retrieval request retrieved in the input means, the retrieval information designated in the data base processing means being stored in the data base means.

5. An electronic document filing system according to claim 4 in which a piece of classification attribute information representatively stored in a classification attribute information file is automatically designated as a piece of retrieval information of a type of classification in the data base processing means and is stored in the data base means when the classification attribute information is stored in the classification attribute information file, and a piece of document attribute information representatively stored in a document attribute information file is automatically designated as a piece of retrieval information of a document in the data base processing means and is stored in the data base means when the document attribute information is stored in the document attribute information file.

6. An electronic document filing system according to claim 1 in which the plurality of document files stored in the contents file block of each document are written according to different formats.

* * * * *